(12) United States Patent
Stancato et al.

(10) Patent No.: US 9,527,408 B2
(45) Date of Patent: Dec. 27, 2016

(54) DEPLOYABLE THIGH SUPPORT IN A VEHICLE SEAT

(71) Applicant: Ford Global Technologies, LLC, Dearborn, MI (US)

(72) Inventors: Cortney Stancato, Novi, MI (US); Robert William McCoy, Ann Arbor, MI (US); Jaeho Cho, Shelby Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/675,367

(22) Filed: Mar. 31, 2015

(65) Prior Publication Data

US 2016/0288668 A1     Oct. 6, 2016

(51) Int. Cl.
| | |
|---|---|
| *B60R 21/00* | (2006.01) |
| *B60R 21/207* | (2006.01) |
| *B60R 22/26* | (2006.01) |
| *B60N 2/02* | (2006.01) |
| *B60R 21/02* | (2006.01) |
| *B60N 2/00* | (2006.01) |
| *B60R 21/04* | (2006.01) |

(52) U.S. Cl.
CPC ............ *B60N 2/0296* (2013.01); *B60N 2/002* (2013.01); *B60N 2/0284* (2013.01); *B60R 21/02* (2013.01); *B60R 2021/0273* (2013.01); *B60R 2021/0407* (2013.01)

(58) Field of Classification Search
CPC ..... B60N 2/0296; B60N 2/0284; B60N 2/002; B60R 21/02; B60R 2021/0407; B60R 2021/0273
See application file for complete search history.

(56) References Cited

U.S. PATENT DOCUMENTS

| | | | | |
|---|---|---|---|---|
| 4,030,207 A | * | 6/1977 | Kron | G09B 9/10 434/59 |
| 6,666,292 B2 | * | 12/2003 | Takagi | B60R 21/01516 180/268 |
| 8,702,120 B2 | | 4/2014 | Kalisz et al. | |
| 2003/0067149 A1 | * | 4/2003 | Gray | B60R 21/01516 280/735 |
| 2006/0144630 A1 | * | 7/2006 | Breed | B60N 2/002 180/273 |

FOREIGN PATENT DOCUMENTS

| | | |
|---|---|---|
| DE | 19735915 | 6/2007 |
| EP | 2065264 | 6/2009 |
| JP | 2004237820 | 8/2004 |
| KR | 2005000891 | 1/2005 |

* cited by examiner

*Primary Examiner* — Mary Cheung
(74) *Attorney, Agent, or Firm* — Frank MacKenzie; Bejin Bieneman PLC

(57) ABSTRACT

First and second pads are configured to be arranged at a front of a vehicle seat. First and second passive movement devices are provided to be respectively arranged under, and to cause movement of, the first and second pads. The first and second passive movement devices are configured to be actuated independently of one another.

20 Claims, 6 Drawing Sheets

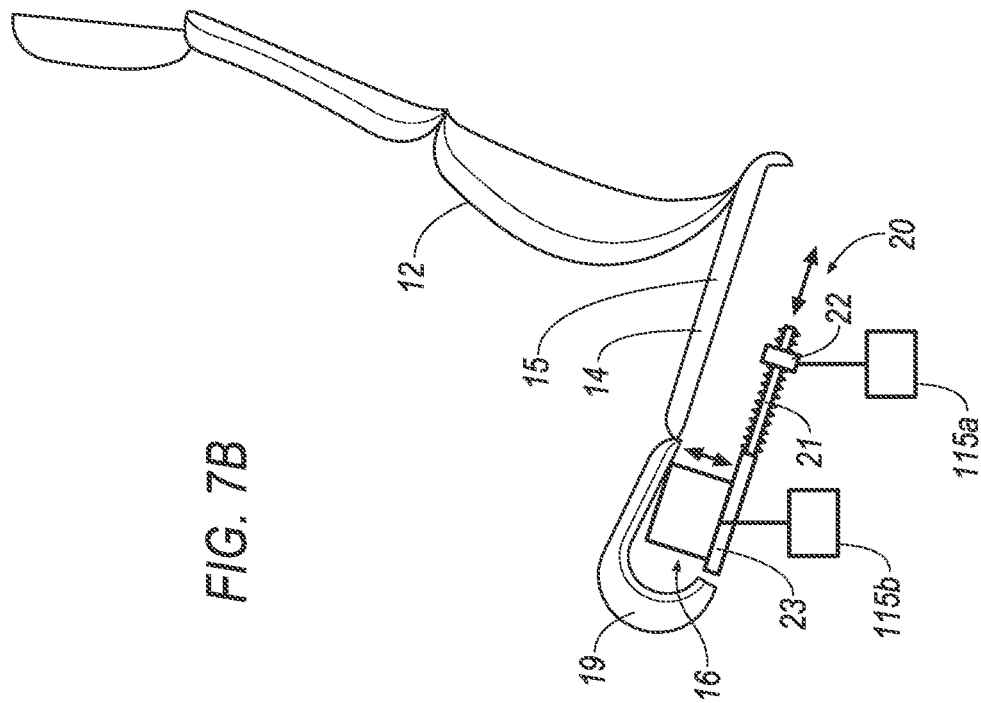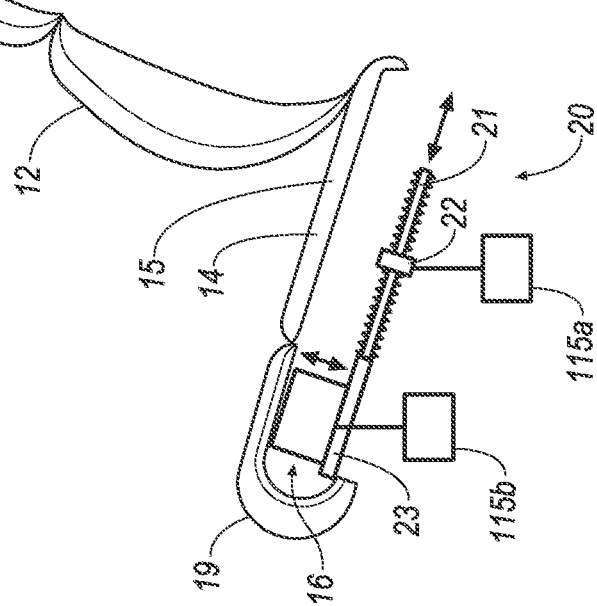

1

DEPLOYABLE THIGH SUPPORT IN A VEHICLE SEAT

BACKGROUND

Vehicle safety systems are often focused on high speed crashes which can cause severe injuries and/or fatalities. However, with older and heavier occupants becoming a larger percentage of the population, focusing on lower speed impacts is also appropriate. In fact, lower speed impacts are often where lower extremity injuries occur. While lower extremity injuries are typically non-life threatening they can have large and undesirable effects on a person's quality of life, as well as high societal costs. Therefore, improvements in vehicle safety systems protecting lower extremities would be desirable.

DRAWINGS

FIGS. 7A and 7B illustrate an embodiment of the system of FIG. 1 including thigh supports, i.e., seat pads, that can move horizontally and vertically.

DESCRIPTION

Figure 1:
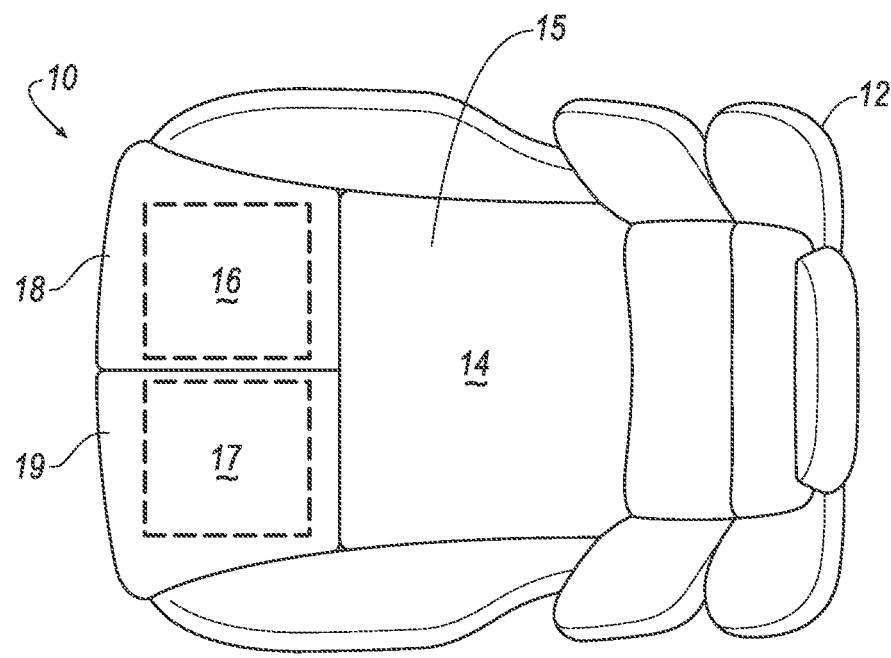
FIG. 1 is a top perspective view of an exemplary thigh support system.
Figure 2:
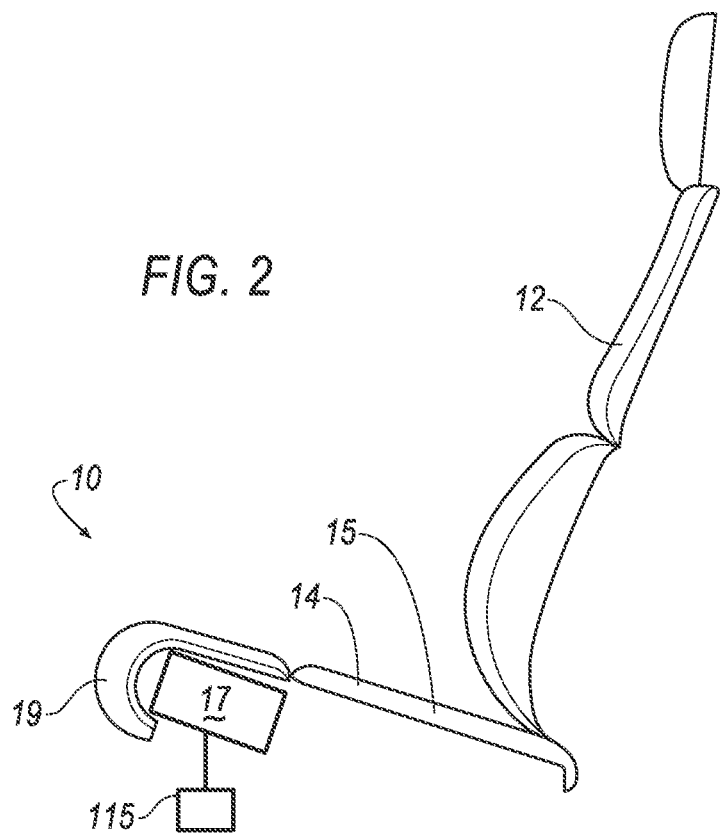
FIG. 2 is a side view of the system of FIG. 1.

With reference to FIGS. 1-6, disclosed herein is a thigh support system 10 that can be installed in a vehicle seat 12 lower portion 14, sometimes also referred to as a seat portion 14 or a horizontal portion 14, even though the portion 14 is not generally, strictly speaking, substantially horizontal. The seat portion 14 generally includes a rear portion 15 as well as first and second articulating seat pads 18, 19. Further, a system 10 in a vehicle may include multiple seats 12, and therefore, with respect to each seat in a plurality of seats in a vehicle, a plurality of respective components described herein with respect to a single vehicle seat 12.

For example, the system 10 includes, installed in a seat 12, first and second passive movement devices 16, 17, that respectively control movement, e.g., articulation, of first and second articulating seat pads 18, 19. The passive movement devices 16, 17 may include any of a variety of known components, such as a gas-inflatable airbag, an inflatable plastic bladder, or the like. For example, the seat pads 18, 19 may be moved up and down, i.e., vertically, with respect to the seat 12 and a vehicle in which the seat 12 is installed by inflation of the passive movement devices 16, 17. Actuation or deployment of the passive movement devices may be triggered by a triggering mechanism 115, such as is known, e.g., a gas inflator that is pyrotechnically actuated, etc.

The passive movement devices 16, 17 may be actuated independently of one another, and therefore the seat pads 18, 19 may be moved, e.g., articulated, either together or independently of one another. Further, the seat pads 18, 19 may be articulated, e.g., moved vertically, independently of a rear portion 15 of the seat 12 lower portion 14. Note that in the present context "vertically" means that the mechanisms 16, 17, move the pads 18, 19 generally up and down with respect to the horizontal portion 14. However, just as the portion 14 may deviate somewhat, e.g., by up to approximately ten or twenty degrees, from being perfectly horizontal, vertical movement of the pads 18, 19 may likewise deviate from being perfectly vertical.

Figure 3:
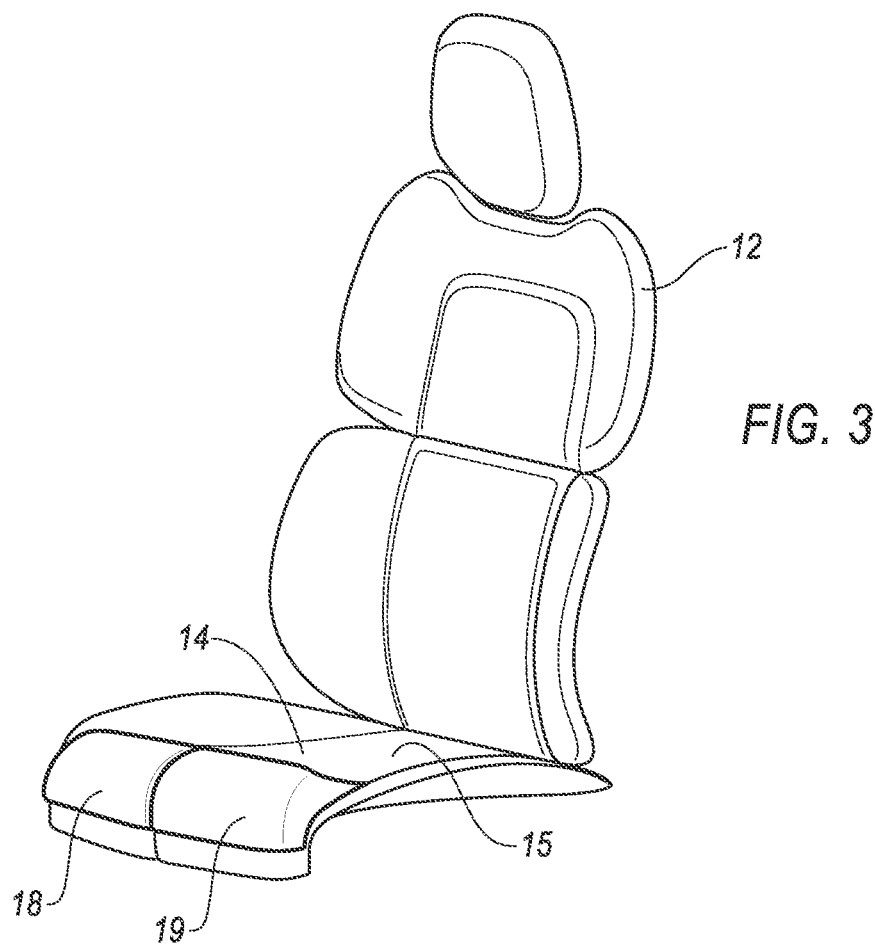
FIG. 3 is a perspective view of the system of FIG. 1 showing an undeployed state and a deployed state.
Figure 4:
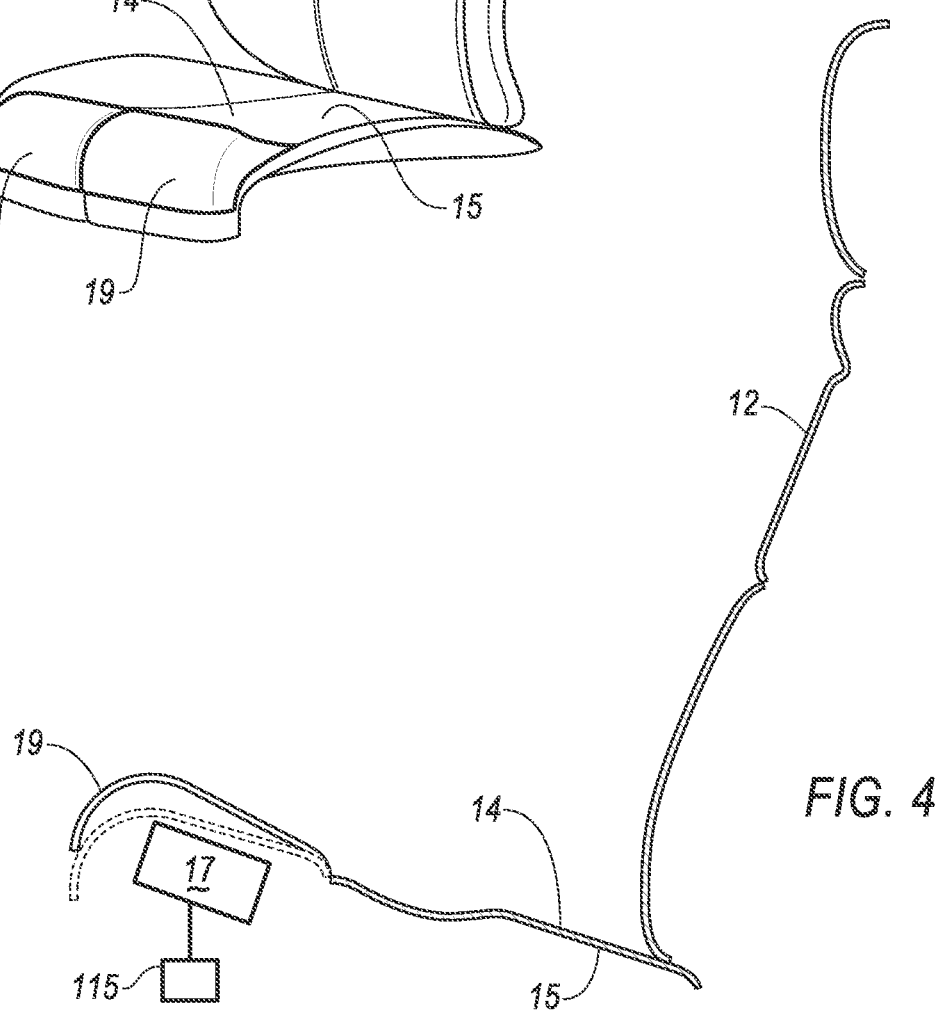
FIG. 4 is a side view of the system of FIG. 1 showing an undeployed state and undeployed state.
Figure 5:
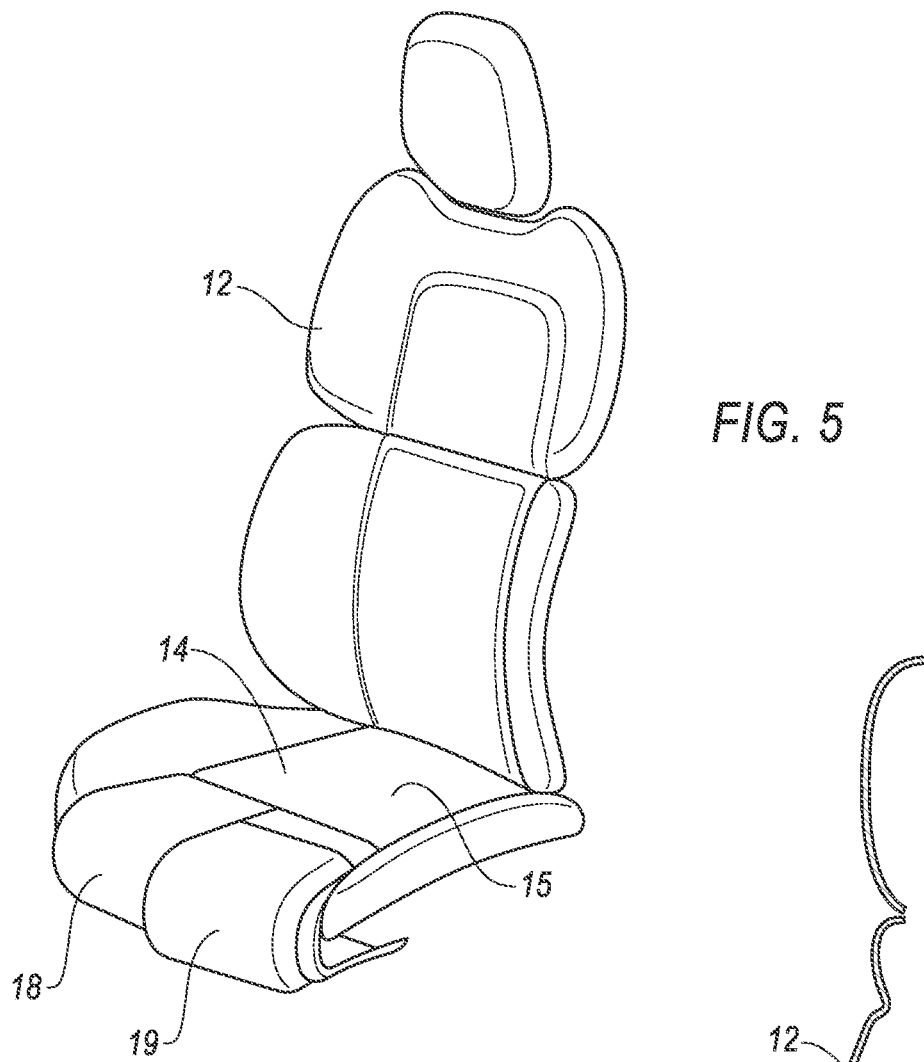
FIG. 5 is a perspective view of the system of FIG. 1 in a further example of a deployed state.
Figure 6:
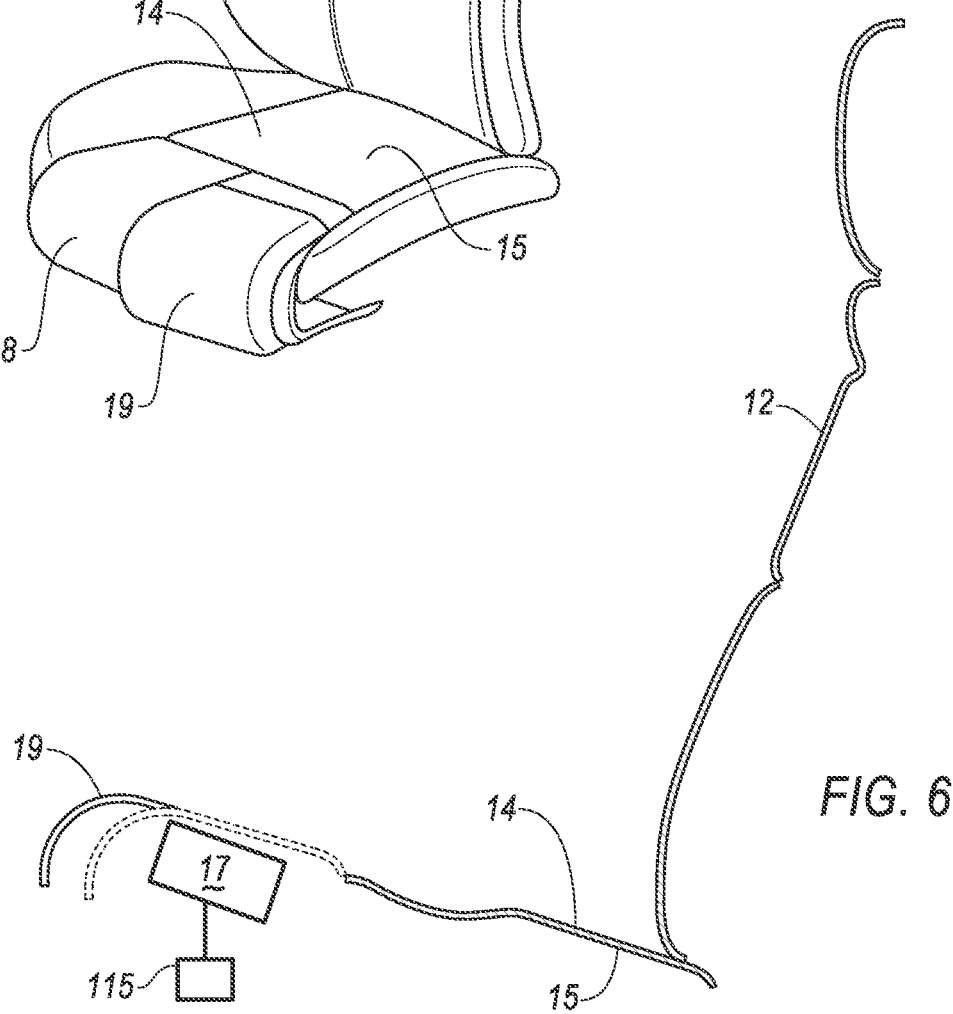
FIG. 6 is a side view of the system of FIG. 1 in the deployed state of FIG. 5.

FIGS. 3 and 4 provide an illustration that one or both of the seat pads 18, 19 may be moved in an upward direction, from an undeployed state to a deployed state, by deployment of the passive movement devices 16, 17. Further, as seen in FIGS. 5 and 6, one or both of the seat pads 18, 19 may alternatively be moved in a forward direction, from an undeployed state to a deployed state, by the passive movement devices 16, 17. That is, the seat pads 18, 19 can be restrained in a horizontal direction so that they move vertically upon deployment of the devices 16, 17 (FIGS. 3, 4), or the seat pads 18, 19 can be restrained in a vertical direction so that they move horizontally upon deployment of the devices 16, 17.

Yet further alternatively or additionally, as illustrated in FIGS. 7A-7B, one or more horizontal movement devices 20 may be arranged, e.g., via a drive mechanism 21, to move seat pads 18, 19 fore and aft, i.e., substantially in a direction along, or parallel to, a longitudinal axis of a vehicle, alternatively or additionally to vertically. That is, one or more devices 20 may be provided as a substitute for, or as a complement to, one or more devices 16, 17.

For example, each of the respective passive movement devices 16, 17 may be used as vertical movement devices, and may be paired with a horizontal movement device 20. For example, a drive mechanism 21, e.g., a piston or worm gear or the like, may be actuated by a stored energy device 22 that in turn is connected to a rigid member 23, e.g., a stiff rod, to moves a pad 18 or 19. A triggering mechanism 115a may be used to release energy from the stored energy device 22, thereby causing movement of the horizontal drive mechanism 21, causing the member 23 to force a seat pad 18 or 19 forward. Alternatively or additionally, e.g., possible at substantially the same time, a triggering mechanism or mechanisms 115b may be used to deploy a device 16 and/or device 17, forcing a seat pad 18 and/or a seat pad 19 upward.

Figure 8:
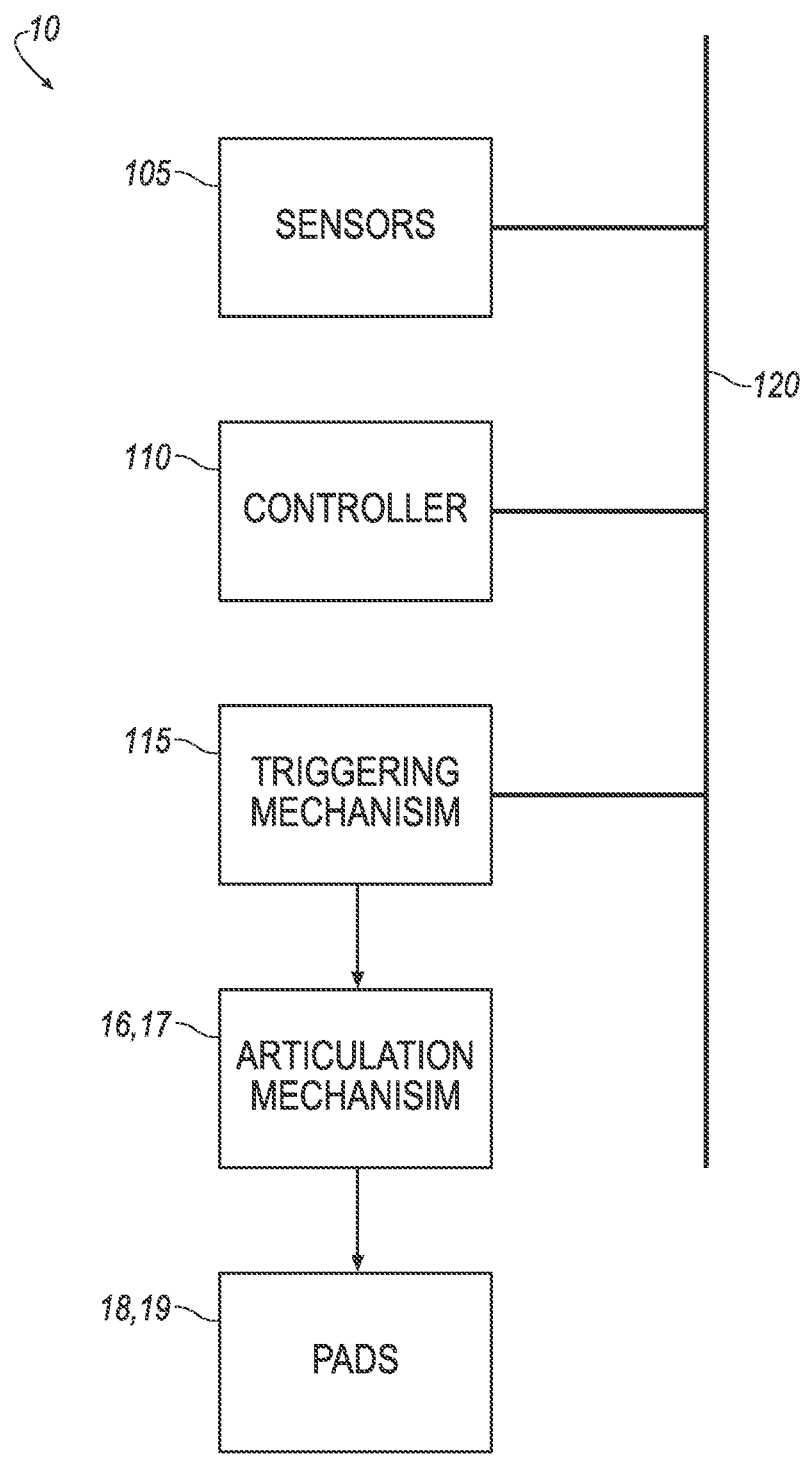
FIG. 8 is a block diagram of the exemplary thigh support system of FIG. 1.

FIG. 8 is a block diagram of the exemplary thigh support system 10 of FIG. 1. The system 10 includes impact sensors 105 such as are known for providing data to a controller 110 to determine the occurrence of an impact or likely impact. The controller 110 generally includes a processor and a memory, the memory storing instructions executable by the processor for evaluating data from sensors 105 and/or providing an instruction to a actuating mechanism 115. A vehicle communication bus 120, e.g., a controller area network (CAN) bus or the like, such as is known, may be used to provide various communications, including data from sensors 105 to the controller 110, as well as one or more instructions from the controller 110 to one or more actuating mechanisms 115 associated with respective passive movement devices 16, 17. Accordingly, the controller 110 may receive data from sensors 105 from which an occurrence or likely occurrence of an impact, e.g., a low-speed impact, may be identified. The controller 110 may then send an instruction to a actuating mechanism 115, e.g., an inflator of an airbag or bladder included in an passive movement devices 16, 17, and actuator of a motor 20, etc., to actuate one or both passive movement devices 16, 17.

Figure 9:
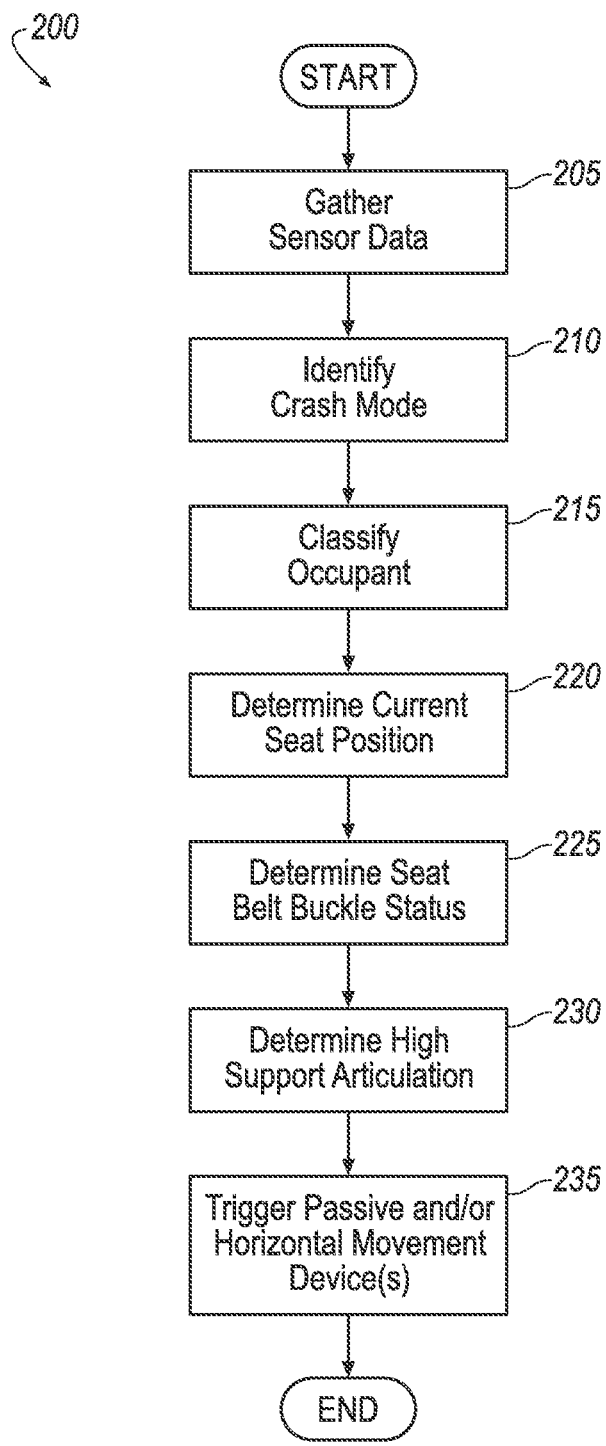
FIG. 9 illustrates an exemplary process flow for the system of FIG. 1.

FIG. 9 illustrates an exemplary process 200 that may be executed according to instructions in the controller 110. Before the process 200 begins, the pads 18, 19 may be in a default, or nominal position. As described herein, pads 18, 19 may be moved forward, backward, up, and/or down with respect to the nominal position, e.g., as described with respect to the process 200.

The process 200 may begin in a block 205, in which the controller 110 receives, e.g., via the bus 120, data from various sensors. For example, the controller 110 may receive data from crash sensors such as accelerometers and the like, pre-crash sensors such as radar sensors, image sensors, etc., as well as occupant sensors, e.g., indicating weight, height, age, etc. of one or more vehicle occupants as is known, seat sensors indicating a seat 12 position or positions, seat belt buckle sensors, indicating a status of a seatbelt, e.g., buckled or unbuckled, etc.

Next, in a block 210, generally based on data from crash sensors and/or pre-crash sensors, the controller 110 identifies a crash mode, e.g., frontal, oblique, offset, high-speed, low-speed, pedestrian, etc.

Next, in a block 215, the controller 110 performs an occupant classification, e.g., in a known manner, determines an occupant size, e.g., according to a percentile weight and/or height, etc.

Next, in a block 220, the controller 110 determines a current seat 12 position, e.g., an angle of a back of a seat 12 with respect to a seat bottom 14, a position of a seat 12 on a seat track, etc.

Next, in a block 225, the controller 110 determines a seat belt buckle status, e.g., buckled or unbuckled.

Next, in a block 230, using at least some of the information received and/or determined in the blocks 205-225, the controller 110 determines an appropriate articulation of thigh supports, e.g., pads 18, 19. As mentioned above, one or both of the pads 18, 19 may be moved, i.e., articulated, e.g., in a crash event. Further, it is possible that a pad 18, 19 may be moved horizontally, vertically, or both. Such movement may be determined by the controller 110 according to various factors, e.g., a vehicle speed, a crash mode (e.g., oblique, frontal, side, etc.), and occupant size (e.g., a percentile of a person's mass, weight, and/or heights compared to the general population), a position of a seat, whether a seatbelt is buckled, position of the occupant in the vehicle (e.g., a seat location), etc. For example articulation of the pads 18, 19 could be determined as described in Table 1 below:

Next, in a block 235, the controller 110 sends a message to one or more triggering mechanisms 115 to trigger passive one or more movement devices 16, 17 and/or one or more horizontal movement devices 20.

Following the block 235, the process 200 ends. It is to be understood that certain steps of the process 200 could be omitted, and/or steps of the process 200 could be executed in a different order than described herein.

As used herein, the adverb "substantially" means that a shape, structure, measurement, quantity, time, etc. may deviate from an exact described geometry, distance, measurement, quantity, time, etc., because of imperfections in materials, machining, manufacturing, etc.

In the drawings, the same reference numbers indicate the same elements. Further, some or all of these elements could be changed. With regard to the components, processes, systems, methods, etc. described herein, it should be understood that these are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system, comprising:
   first and second pads configured to be arranged at a front of a vehicle seat;
   first and second passive movement devices respectively arranged under, and to cause movement of, the first and second pads;
   wherein the first and second passive movement devices are configured to be actuated independently of one another and to move the first and second pads inde-

TABLE 1

| Pass. Size | Pass. Gender | Seat Pos. | Belted? | Seat Loc. | Crash Mode | Vehicle Speed | Left Pad Pos. | Right Pad Pos. |
|---|---|---|---|---|---|---|---|---|
| 50th | Male | mid-track | Yes | Driver | Left-side oblique | 30 mph | Down | Nominal |
| 5th | Female | mid-track | No | Passenger | Full frontal | 30 mph | Up | Up |
| 95th | Male | full rear track | Yes | Driver | Offset | 25 mph | Nominal | Nominal |
| 5th | Female | full forward track | Yes | Driver | Full frontal | 35 mph | Up | Nominal | pendently of one another upon actuation of the first and second passive movement devices.

2. The system of claim 1, further comprising a controller that includes a processor and a memory, the memory storing instructions executable by the processor to actuate at least one of the passive movement devices.

3. The system of claim 2, wherein the memory further stores instructions executable by the processor to receive data from at least one impact sensor, and to use the received data in determining to actuate at least one of the passive movement devices.

4. The system of claim 3, wherein the memory further stores instructions executable by the processor to actuate only one of the first and second passive movement devices based on the received data.

5. The system of claim 1, wherein the passive movement devices include one of an airbag and a plastic bladder.

6. The system of claim 1, wherein the passive movement devices include a motor.

7. The system of claim 1, wherein the first and second passive movement devices are arranged to move the respective first and second pads at least one of vertically and horizontally with respect to a vehicle.

8. The system of claim 1, wherein the first and second passive movement devices are arranged to move the respective first and second pads vertically, the system further comprising at least one horizontal movement device, wherein each at least one horizontal movement device is arranged to move a respective one of the pads horizontally.

9. The system of claim 8, wherein each at least one horizontal movement device includes a stored energy device that is arranged to release a horizontal movement mechanism.

10. The system of claim 9, further comprising a controller that includes a processor and a memory, the memory storing instructions executable by the processor to actuate at least one of the passive movement devices and the stored energy device.

11. A method, comprising:
using data relating to an impact to determine to actuate at least one of a first passive movement device and a second passive movement device that that are respectively arranged under, and to cause movement of, first and second pads in a vehicle seat; wherein the first and second passive movement devices are configured to be actuated independently of one another and to move the first and second pads independently of one another upon actuation of the first and second passive movement devices.

12. The method of claim 11, further comprising actuating one or both of the first and second passive movement devices based on the received data.

13. The method of claim 11, wherein the first and second passive movement devices are arranged to move the respective first and second pads at least one of vertically and horizontally with respect to a vehicle.

14. The method of claim 11, wherein the first and second passive movement devices are arranged to move the respective first and second pads vertically, the method further comprising, based on the data relating to the impact, moving at least one horizontal movement device that is arranged to move a respective one of the pads horizontally.

15. The method of claim 14, wherein each at least one horizontal movement device includes a stored energy device that is arranged to release a horizontal movement mechanism, the method further comprising actuating at least one of the passive movement devices and the stored energy device.

16. A controller that includes a processor and a memory, the memory storing instructions executable by the processor, including instructions to:
use data relating to an impact to determine to actuate at least one of a first passive movement device and a second passive movement device that that are respectively arranged under, and to cause movement of, first and second pads in a vehicle seat; wherein the first and second passive movement devices are configured to be actuated independently of one another and to move the first and second pads independently of one another upon actuation of the first and second passive movement devices.

17. The controller of claim 16, the instructions further including instructions to actuate one or both of the first and second passive movement devices based on the received data.

18. The controller of claim 16, wherein the first and second passive movement devices are arranged to move the respective first and second pads at least one of vertically and horizontally with respect to a vehicle.

19. The controller of claim 16, wherein the first and second passive movement devices are arranged to move the respective first and second pads vertically, the instructions further including instructions to, based on the data relating to the impact, move at least one horizontal movement device that is arranged to move a respective one of the pads horizontally.

20. The controller of claim 19, wherein each at least one horizontal movement device includes a stored energy device that is arranged to release a horizontal movement mechanism, the instructions further including instructions to actuate at least one of the passive movement devices and the stored energy device.

* * * * *